US012561999B2

(12) United States Patent (10) Patent No.: US 12,561,999 B2

Ishiyama (45) Date of Patent: *Feb. 24, 2026

(54) PTP MANAGEMENT SYSTEM

(71) Applicant: NEC Corporation, Tokyo (JP)

(72) Inventor: Rui Ishiyama, Tokyo (JP)

(73) Assignee: NEC Corporation, Tokyo (JP)

( * ) Notice: Subject to any disclaimer, the term of this patent is extended or adjusted under 35 U.S.C. 154(b) by 97 days.

This patent is subject to a terminal disclaimer.

(21) Appl. No.: 18/574,413

(22) PCT Filed: Jul. 1, 2021

(86) PCT No.: PCT/JP2021/024988

§ 371 (c)(1),
(2) Date: Dec. 27, 2023

(87) PCT Pub. No.: WO2023/276118

PCT Pub. Date: Jan. 5, 2023

(65) Prior Publication Data

US 2024/0290127 A1 Aug. 29, 2024

(51) Int. Cl.
*G06V 30/418* (2022.01)
*G06V 10/141* (2022.01)
*H04N 23/56* (2023.01)
*H04N 23/74* (2023.01)

(52) U.S. Cl.
CPC .......... *G06V 30/418* (2022.01); *G06V 10/141* (2022.01); *H04N 23/56* (2023.01); *H04N 23/74* (2023.01)

(58) Field of Classification Search
CPC .... G06V 10/141; G06V 20/66; G06V 30/418; G16H 30/00; H04N 23/56; H04N 23/74

USPC .......................................................... 348/161
See application file for complete search history.

(56) References Cited

U.S. PATENT DOCUMENTS

| 3,902,942 A | * | 9/1975 | Vecchiarelli | ............ B29C 63/02 |
| | | | | 156/219 |
| 2013/0221097 A1 | * | 8/2013 | Day | ........................ A61M 5/20 |
| | | | | 235/437 |
| 2019/0283910 A1 | * | 9/2019 | Taguchi | ............. G01N 21/8851 |
| 2020/0034658 A1 | * | 1/2020 | Chung | .................... G06F 18/28 |

(Continued)

FOREIGN PATENT DOCUMENTS

| JP | 2007-327752 A | | 12/2007 |
| JP | 4337422 B | | 9/2009 |
| JP | 2015206711 A | * | 11/2015 |

(Continued)

OTHER PUBLICATIONS

International Search Report for PCT Application No. PCT/JP2021/024988, mailed on Sep. 7, 2021.

(Continued)

*Primary Examiner* — Kathleen M Walsh

(74) *Attorney, Agent, or Firm* — Sughrue Mion, PLLC

(57) ABSTRACT

A PTP management system includes an acquisition unit that captures an image of a PTP sheet with a camera from an opening side or a protruding side of pockets having a printed portion, to thereby acquire the image including the printed portion and a lattice pattern image formed on a cover film, and a generation unit that generates, from the acquired image, an image for individual identification to be used for identifying the PTP sheet.

15 Claims, 16 Drawing Sheets

(56) References Cited

U.S. PATENT DOCUMENTS

| | | | | |
|---|---|---|---|---|
| 2020/0369422 A1* | 11/2020 | Taguchi | .................... | A61J 3/06 |
| 2022/0050066 A1* | 2/2022 | Ohtani | ................... | G01N 23/16 |

FOREIGN PATENT DOCUMENTS

| | | |
|---|---|---|
| JP | 2018-026147 A | 2/2018 |
| JP | 2019-139640 A | 8/2019 |
| JP | 2020-018353 A | 2/2020 |
| WO | 2016/194680 A1 | 12/2016 |

OTHER PUBLICATIONS

JP Office Action for JP Application No. 2023-531300, mailed on Feb. 25, 2025 with English Translation.

* cited by examiner

FIG. 13

$$Sh = \frac{SUM}{TOTAL\ NUMBER\ OF\ PIXELS} \quad \cdots (1)$$

$$SUM = \sum_{i=0}^{x} \sum_{j=0}^{y} \left\{ \sqrt{[\,G(i+1,j)-G(i,j)\,]^2 + [\,G(i,j+1)-G(i,j)\,]^2} + \left|\,G(i+1,j)-G(i,j)\,\right| + \left|\,G(i,j+1)-G(i,j)\,\right| \right\} \quad \cdots (2)$$

PTP MANAGEMENT SYSTEM

This application is a National Stage Entry of PCT/JP2021/024988 filed on Jul. 1, 2021, the contents of all of which are incorporated herein by reference, in their entirety.

TECHNICAL FIELD

The present invention relates to a PTP management system for managing individuals of PTP sheets, a PTP management method, a storage medium, and an illumination device.

BACKGROUND ART

In the field of drug packaging, Press Through Pack (PTP) sheets are widely used as packages for solid preparations such as tablets and capsules. PTP sheets are also called "Blister Packs" or "Blister Packages." A PTP sheet has a container film including a plurality of pockets provided on one surface and each having an opening, and a flange portion provided on the periphery of the pockets and constituting the one surface. The pockets contain solid preparations that are contents, and the pockets are sealed with a breakable cover film by heat bonding on the flange portion.

Along with a problem of counterfeit drugs that is getting worse, the importance of managing individual drugs is increasing year by year. Therefore, even for PTP sheets that are widely used as a form of packaging drugs, it is important to identify the individuals.

In general, as a method of identifying individuals of objects, a method of attaching a label such as a bar code or a QR code (registered trademark) in which individual identification information is printed, a radio frequency identifier (RFID) in which individual identification information is stored, or the like to the object has been known. There is also a method of directly printing individual identification information on an object by means of a laser marker or inkjet. However, in the individual identification using a method of imparting individual identification information to the objects, labels to be attached to the objects or printing facilities for printing on the objects are required. As a result, the manufacturing cost is increased. Moreover, the method of imparting individual identification information to the objects requires a work of attaching labels to the objects or a work of printing individual identification information on the objects.

Meanwhile, identification of individuals of objects is performed by using artifact metrics such as printing blur or a so-called object fingerprint (for example, see Patent Literatures 1 and 2). With such a method, it is possible to perform individual identification of an object without need of processing for imparting individual identification information.

CITATION LIST

Patent Literature

Patent Literature 1: JP 4337422 B
Patent Literature 2: JP 2019-139640 A

SUMMARY OF INVENTION

Technical Problem

However, artifact metrics or object fingerprint is very small in size such as in micrometer order. Therefore, in the case of applying it to individual identification of PTP sheets, a high-resolution imaging means is required.

An object of the present invention is to provide a PTP management system that solves the problem described above.

Solution to Problem

A PTP management system, according to one aspect of the present invention, is a system for managing an individual of a PTP sheet. The PTP sheet includes a transparent or translucent container film including a plurality of pockets provided on one surface and each having an opening, and a flange portion provided on the periphery of the pockets and constituting the one surface. Each of the pockets contains a content. The pockets are sealed with a cover film by heat bonding on the flange portion. The cover film is breakable and includes a predetermined printed portion on at least one surface. The PTP management system is configured to include an acquisition unit that captures an image of the PTP sheet with a camera from an opening side or a protruding side of the pockets having the printed portion, to thereby acquire the image including the printed portion and a lattice pattern image formed on the cover film at the time of heat bonding, and a generation unit that generates, from the acquired image, an image for individual identification to be used for identifying the PTP sheet.

A PTP management method, according to another aspect of the present invention, is a method for managing an individual of a PTP sheet. The PTP sheet includes a transparent or translucent container film including a plurality of pockets provided on one surface and each having an opening, and a flange portion provided on the periphery of the pockets and constituting the one surface Each of the pockets contains a content. The pockets are sealed with a cover film by heat bonding on the flange portion. The cover film is breakable and includes a predetermined printed portion on at least one surface. The PTP management method is configured to include capturing an image of the PTP sheet with a camera from an opening side or a protruding side of the pockets having the printed portion, thereby acquiring the image including the printed portion and a lattice pattern image formed on the cover film at the time of heat bonding, and from the acquired image, generating an image for individual identification to be used for identifying the PTP sheet.

A computer-readable medium, according to another aspect of the present invention, is configured to store thereon a program for causing a computer for managing an individual of a PTP sheet to execute processing. The PTP sheet includes a transparent or translucent container film including a plurality of pockets provided on one surface and each having an opening, and a flange portion provided on the periphery of the pockets and constituting the one surface. Each of the pockets containing a content. The pockets are sealed with a cover film by heat bonding on the flange portion. The cover film is breakable and includes a predetermined printed portion on at least one surface. The processing includes capturing an image of the PTP sheet with a camera from an opening side or a protruding side of the pockets having the printed portion, thereby acquiring the image including the printed portion and a lattice pattern image formed on the cover film at the time of heat bonding, and from the acquired image, generating an image for individual identification to be used for identifying the PTP sheet.

An illumination device, according to another aspect of the present invention, is an illumination device used for capturing an image of a PTP sheet with a camera. The device is configured to include a dome illumination unit that illuminates the PTP sheet with light at an elevation angle that is equal to or larger than a predetermined elevation angle, a coaxial vertical illumination unit provided between the dome illumination unit and the camera, and a ring illumination unit provided between the dome illumination unit and the PTP sheet. The ring illumination unit is turned off at the time of capturing an image for individual identification of the PTP sheet, and is turned on at the time of capturing an image for appearance inspection of the PTP sheet.

Advantageous Effects of Invention

With the configurations described above, the present invention is able to perform individual identification of PTP sheets without need of a high-resolution imaging means.

BRIEF DESCRIPTION OF DRAWINGS

FIG. 13 illustrates examples of expressions used for calculating image sharpness by the illumination adjustment unit used in the fourth example of the illumination unit in the PTP management device according to the first example embodiment of the present invention.

DESCRIPTION OF EMBODIMENTS

In the process of studying individual identification of PTP sheets, the present inventor found that the position relationship between a printed portion and a lattice pattern is not the same in all individual of PTP sheets and there is a difference between them, and the present inventor has made the present invention. Hereinafter, embodiments of the present invention will be described with reference to the drawings.

First Example Embodiment

Figure 1:
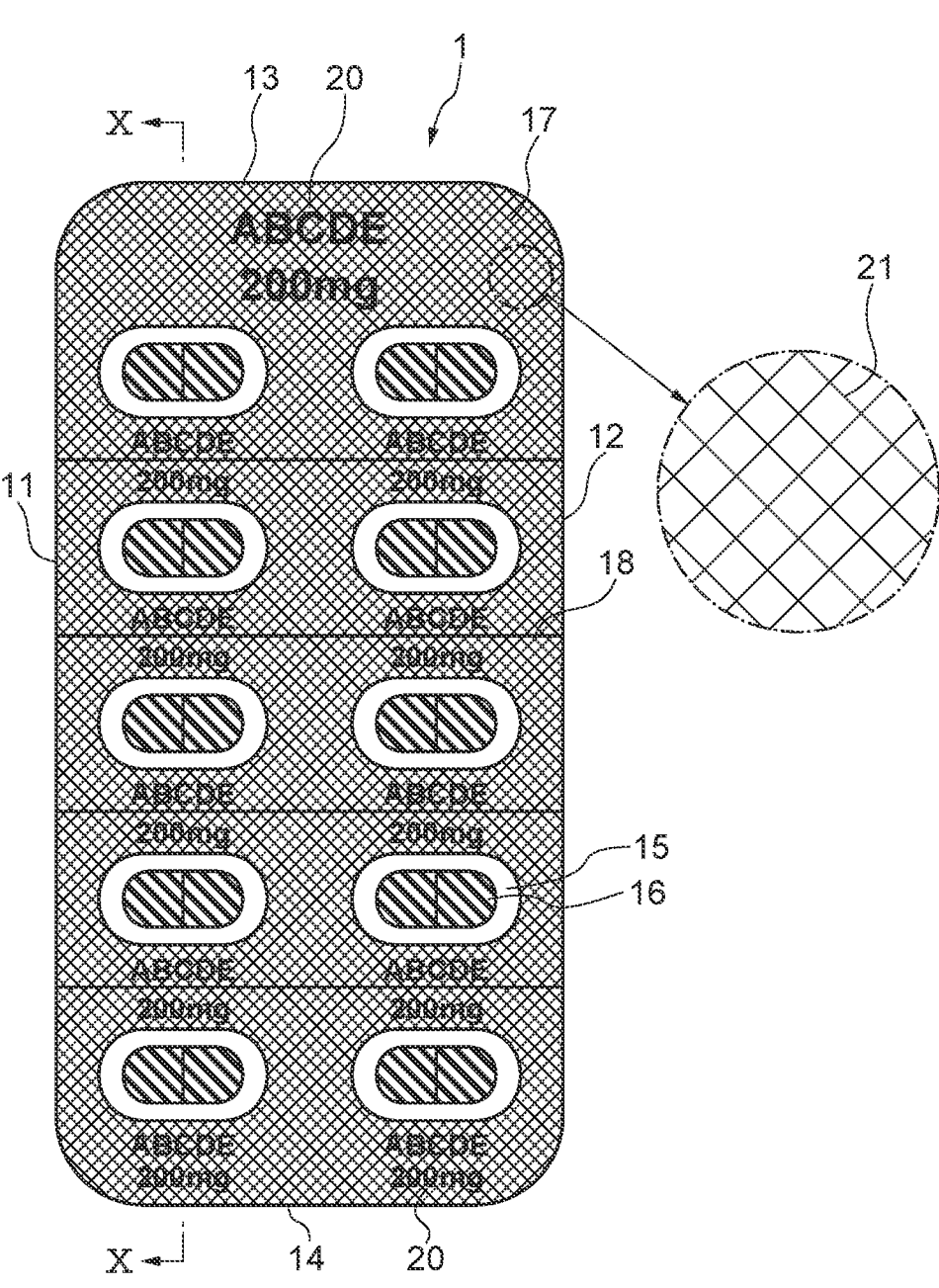
FIG. 1 is a plan view illustrating an example of a PTP sheet managed in a first example embodiment of the present invention.
Figure 2:
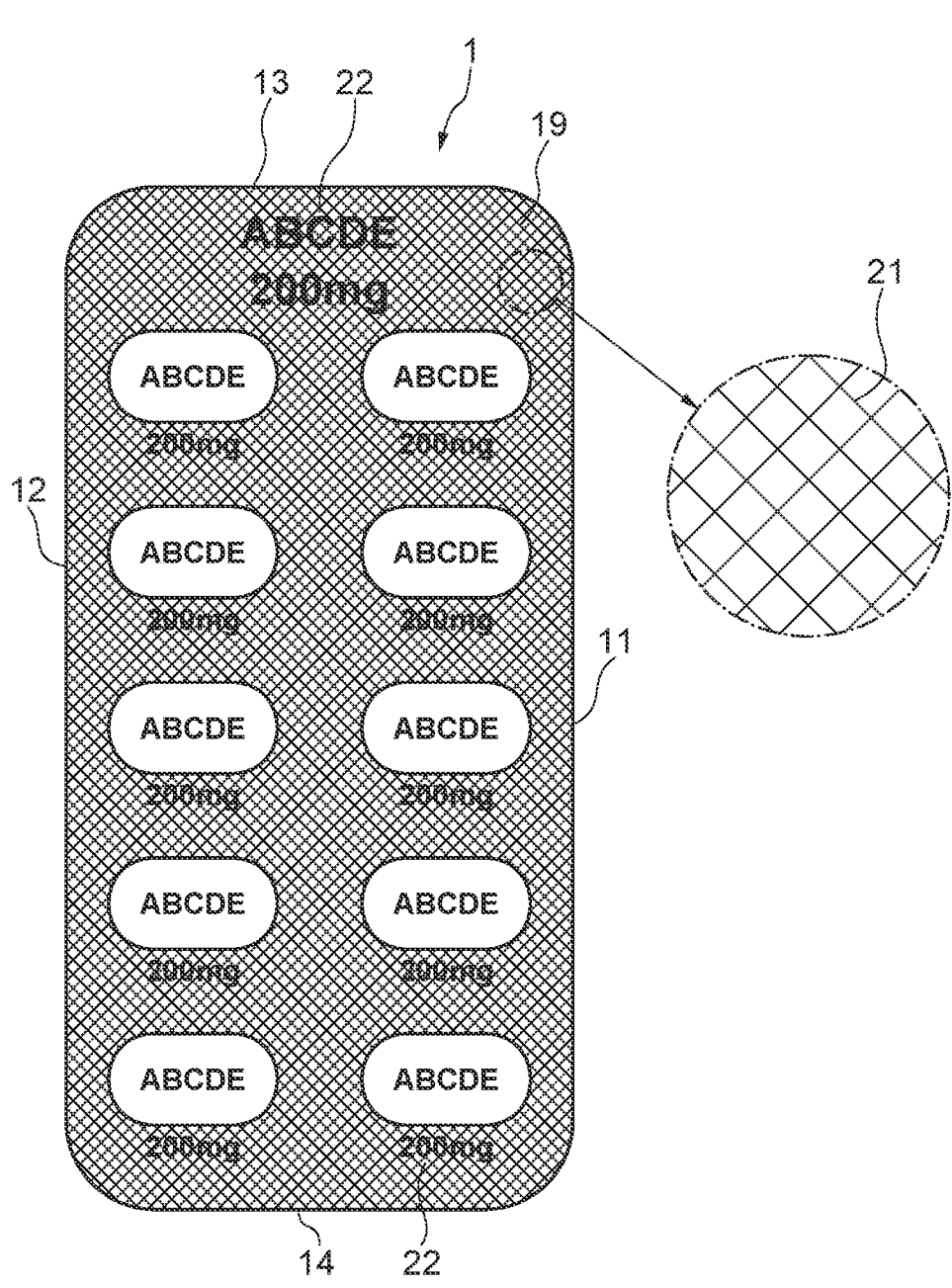
FIG. 2 is a plan view of the PTP sheet illustrated in FIG. 1, as viewed from a rear surface side (opening side of a pocket).
Figure 3:
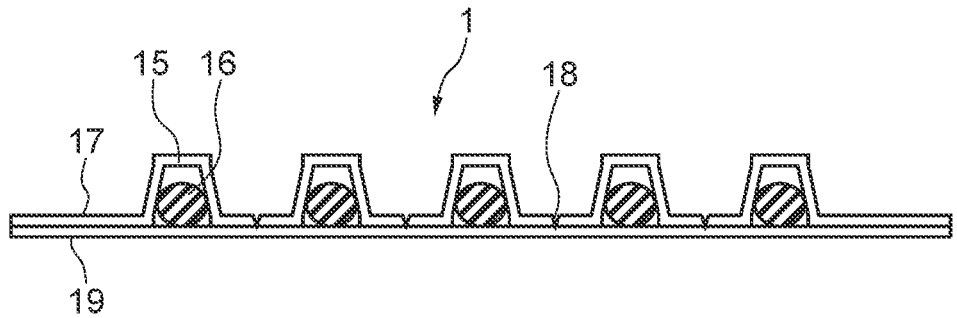
FIG. 3 is a cross-sectional view taken along a line X-X in FIG. 1.

FIG. 1 is a plan view illustrating an example of a PTP sheet 1 managed in a first example embodiment of the present invention, as viewed from the front surface side (protruding side of a pocket 15). FIG. 2 is a plan view of the PTP sheet 1 illustrated in FIG. 1, as viewed from a rear surface side (opening side of the pocket 15). FIG. 3 is a cross-sectional view taken along a line X-X in FIG. 1. Referring to FIGS. 1 to 3, the PTP sheet 1 is in a rectangular shape in a plan view. The periphery thereof includes long side portions 11 and 12 that extend along the longitudinal direction of the PTP sheet 1 and are opposed and parallel to each other, and short side portions 13 and 14 that are provided between the both long side portions 11 and 12 and are opposed and parallel to each other. The PTP sheet includes two pocket rows formed in the direction of the short side portions 13 and 14, and each pocket row includes five pockets 15 arranged along the long side portions 11 and 12. That is, ten pockets 15 are formed in total. Each pocket 15 contains one tablet 16 as a content. A container film 17 is made of a transparent or translucent material (for example, non-stretched polypropylene or the like), and has a plurality of lateral slits 18 so as to allow a small pair piece including two pockets 15 to be cut off, for example. A cover film 19 is made of an opaque material (for example, aluminum foil or the like). On a surface of a side attached to the container film 17, a predetermined printed portion 20 is provided. In the present example, the printed portion 20 includes a character string "ABCDE" and a character string "200 mg" that are shown together in two columns. The printed portion 20 is provided for each pocket 15 one to one, and also provided at the top portion (tag portion) of the PTP sheet. The printed portion 20 is visible from the front surface side of the PTP sheet 1 through the container film 17 as illustrated in FIG. 1. Further, a lattice stamp, formed when a cover film 19 is heat bonded to the container film 17, covers not only the cover film 19 but also the attachment surface of the container film 17. Therefore, a lattice pattern 21 of the stamp is visible from the rear surface side (cover film 19 side) of the PTP sheet 1 as illustrated in FIG. 2, and also visible from the front surface side (container film 17 side) of PTP sheet 1 through the container film 17 as illustrated in FIG. 1.

Moreover, on a surface of the cover film 19 that is opposite to the side attached to the container film 17, a predetermined printed portion 22 is provided. In the present example, the printed portion 22 includes a character string "ABCDE" and a character string "200 mg" that are shown together in two columns, similarly to the printed portion 20. The printed portion 22 is provided for each pocket 15 one to one, and also provided at the top portion (tag portion) of the PTP sheet. Accordingly, as illustrated in FIG. 2, the printed portion 22 and the lattice pattern 21 are visible from the rear surface side of the PTP sheet 1. As illustrated in FIG. 2, since an area of the cover film 19 corresponding to the opening of the pocket 15 is not pressed at the time of heat bonding, the lattice pattern 21 is not formed.

Figure 4A:
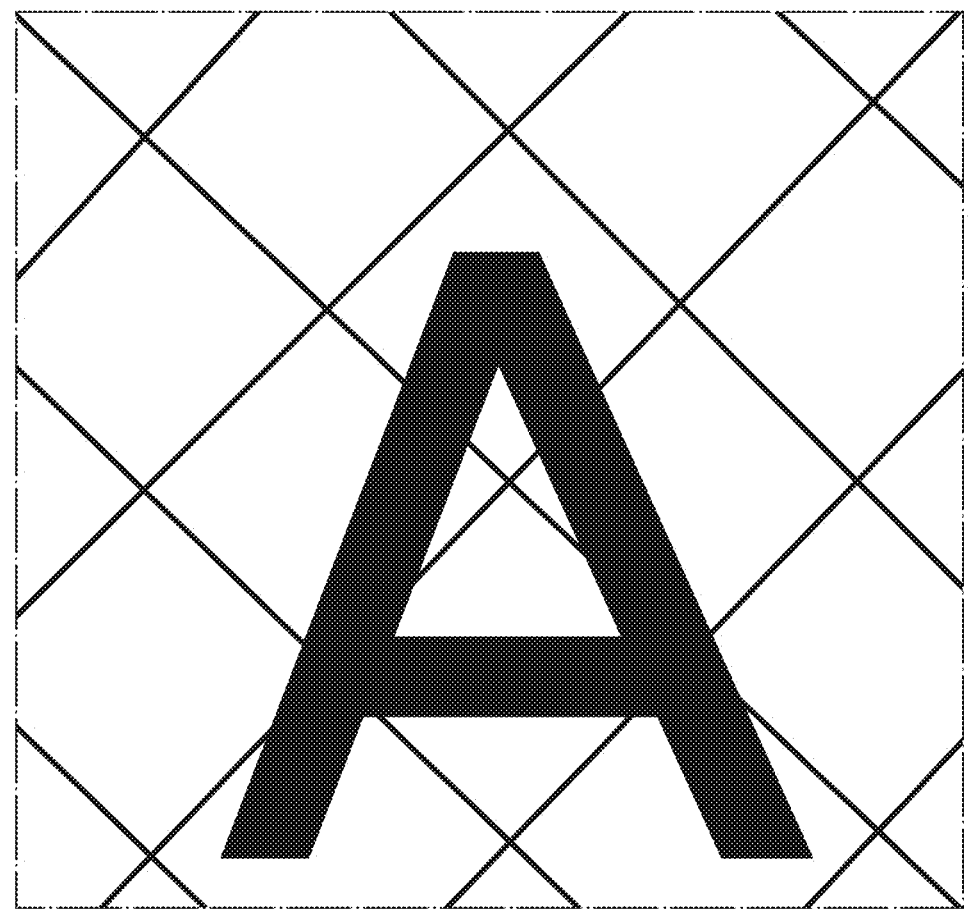
FIG. 4A is an enlarged plan view of a main part near a character "A" in a printed portion printed on the PTP sheet.
Figure 4B:
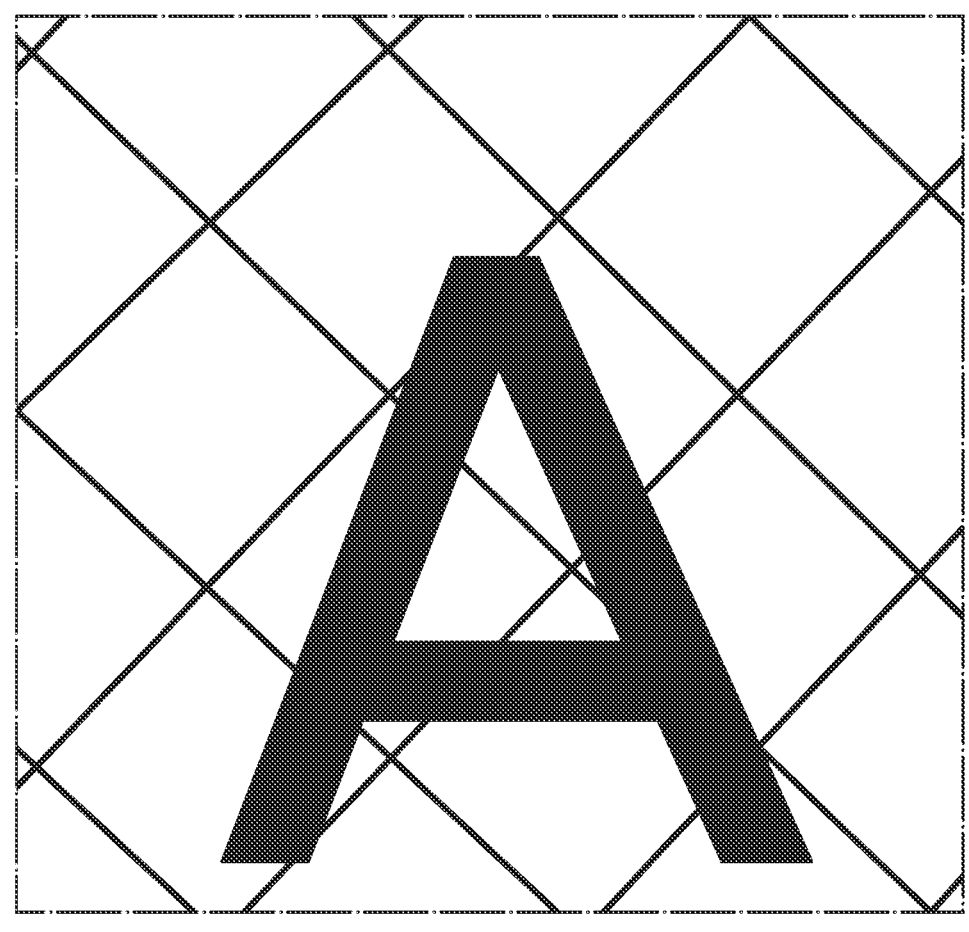
FIG. 4B is an enlarged plan view of a main part near a character "A" at the same location in an individual of a PTP sheet that is different from an individual illustrated FIG. 1.

The PTP sheet 1 as described above is manufactured by a PTP packaging machine. For example, a PTP packaging machine manufactures a large amount of PTP sheets 1 in a short period through a step of forming the pockets 15 with respect to a belt-shaped transparent or translucent container film 17, a step of filling the pockets 15 with objects such as tablets 16, a step of attaching a belt-shaped cover film 19 by heat bonding to a flange portion of the container film 17, a step of punching the belt-shaped PTP film consisting of the container film 17 and the cover film 19 in units of PTP sheet, and the like. For the belt-shaped cover film 19, aluminum foil or the like is used to allow it to be easily broken. On both sides of the belt-shaped cover film 19, printed portions 20 and 22 are formed previously. In the sealing step of attaching the cover film 19 to the container film 17 by heat bonding, in order to prevent breakage of the cover film 19 and generation of pin holes at the time of bonding and to realize firm sealing, a heat plate or a heat roll, made of metal and having a protruding surface processed to be in a lattice pattern, is used to apply press contact from the cover film 19 side. As a result, the lattice pattern 21 is formed on the entire flange portion of the cover film 19 except for the pockets 15. The lattice pattern 21 is visible from the cover film 19 side and also visible from the transparent or translucent container film 17 side. In the sealing step, the attachment position of the belt-shaped cover film 19 with respect to the belt-shaped container film 17 is automatically adjusted such that the printed portions 20 and 22 of the character strings printed on the cover film 19 is set to an appropriate position for each PTP sheet. However, such automatic adjustment does not control the forming position of the lattice pattern 21. Therefore, due to a little stretch or shrink of the cover film 19, the position relationship between the printed portion 20 and 22 and the lattice pattern 21 is not always the same for all individuals of the PTP sheet 1 and a phenomenon of a difference between individuals occurs. FIGS. 4A and 4B illustrate examples thereof.

FIG. 4A is an enlarged plan view of a main part near a character "A" in the printed portion 20 printed on an individual of the PTP sheet 1. FIG. 4B is an enlarged plan view of a main part near a character "A" at the same location on another individual of the PTP sheet 1 that is different from the individual illustrated FIG. 4A. Even for the character "A" at the same location and the lattice pattern 21 around it, the position relationship between the character "A" and the lattice pattern 21 around it is different between the individual of FIG. 4A and the individual of FIG. 4B. The phenomenon that the position relationship between the character and the lattice pattern around it differs between individuals occurs in a number of locations in the PTP sheet 1.

The present embodiment identifies an individual of the PTP sheet 1 by using the position relationship between the printed portion 20 (or 22) and the lattice pattern 21 that is not always the same in respective individuals, which occurs due to such a phenomenon. Hereinafter, a PTP management device 100 according to the present embodiment will be described in detail.

Figure 5:
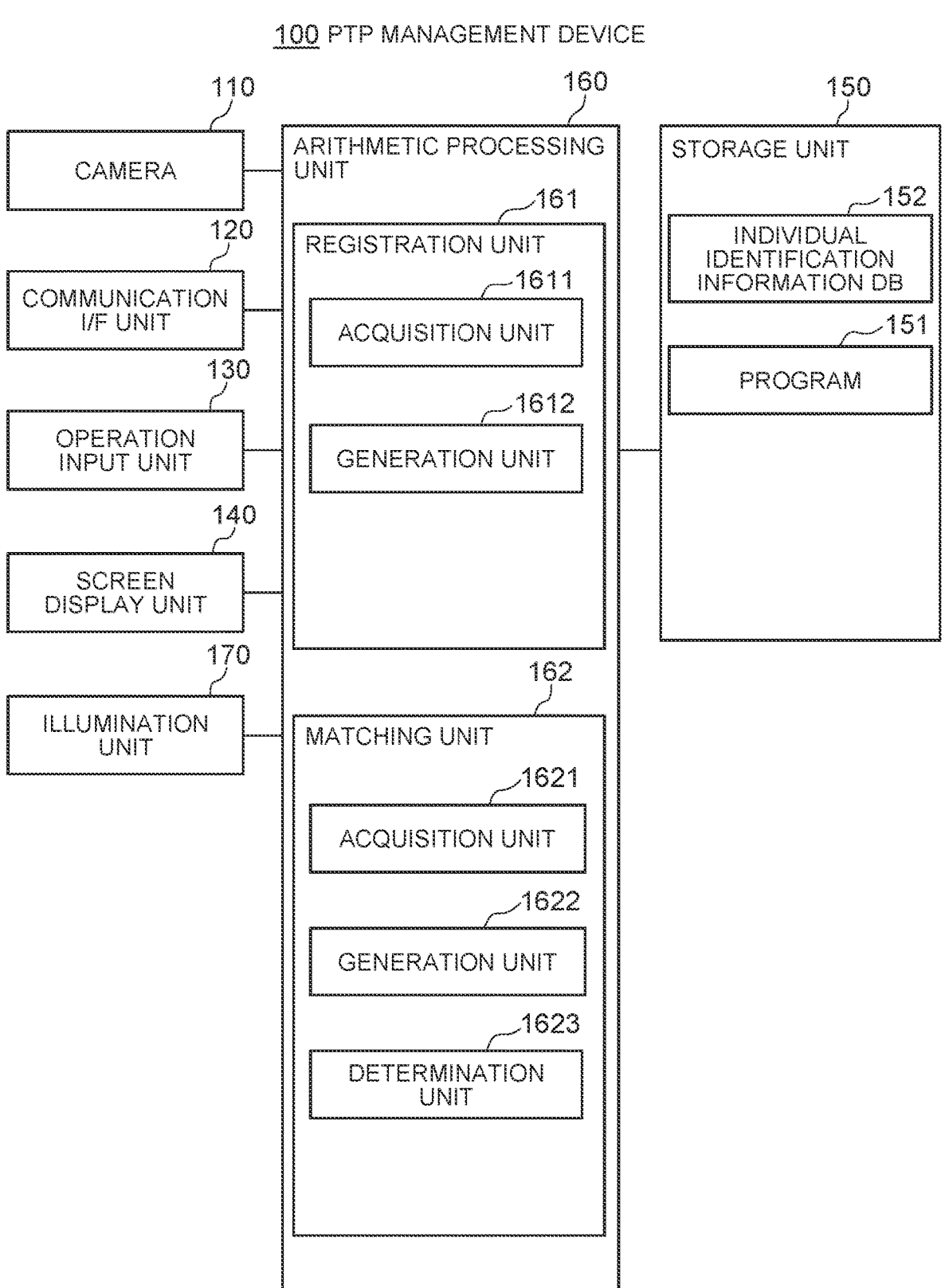
FIG. 5 is a block diagram of a PTP management device according to the first example embodiment of the present invention.

FIG. 5 is a block diagram of the PTP management device 100 according to the first example embodiment of the present invention. The PTP management device 100 illustrated in FIG. 5 is an information processing device that manages individuals of the PTP sheet 1 in order to perform manufacturing step management, quality management, shipping management, sales management, and the like.

Referring to FIG. 5, the PTP management device 100 includes a camera 110, a communication I/F unit 120, an operation input unit 130, a screen display unit 140, a storage unit 150, an arithmetic processing unit 160, and an illumination unit 170.

The camera 110 is an imaging device that images the PTP sheet 1. The camera 110 may be a visible-light color camera or a black-and-white camera equipped with a charge-coupled device (CCD) image sensor or a complementary MOS (CMOS) image sensor having a pixel capacity of about several millions pixels, for example. The illumination unit 170 is configured to irradiate the PTP sheet 1 that is an imaging object with predetermined light.

The communication I/F unit 120 is configured of a data communication circuit, and is configured to perform data communication with an external device in a wireless or wired manner. The operation input unit 130 is configured of devices such as a keyboard and a mouse, and is configured to detect operation by an operator and output it to the arithmetic processing unit 160. The screen display unit 140 is configured of a device such as a liquid crystal display (LCD), and is configured to display, on a screen, various types of information according to an instruction from the arithmetic processing unit 160.

The storage unit 150 is configured of storage devices such as a hard disk and a memory, and is configured to store therein processing information and a program 151 necessary for various types of processing in the arithmetic processing unit 160. The program 151 is a program for implementing various processing units by being read and executed by the arithmetic processing unit 160, and is read in advance from an external device or a storage medium, not illustrated, via a data input-output function of the communication I/F unit 120 or the like and is stored in the storage unit 150. The main processing information stored in the storage unit 150 includes an individual identification information DB 152.

The individual identification information DB 152 is a database for storing images (hereinafter also referred to as registration images) for individual identification according to the PTP sheet 1 subject to registration.

The arithmetic processing unit 160 has a processor such as an MPU and the peripheral circuits, and is configured to read and execute the program 151 from the storage unit 150 to allow the hardware and the program 151 to cooperate with each other to thereby implement the various processing units. The main processing units to be implemented by the arithmetic processing unit 160 are a registration unit 161 and a matching unit 162.

The registration unit 161 is configured to generate images for individual identification of the PTP sheet 1 subject to registration, and register them in the individual identification information DB 152. The registration unit 161 includes an acquisition unit 1611 and a generation unit 1612.

The acquisition unit 1611 is configured to capture an image of the PTP sheet 1 subject to registration with the camera 110 from the opening side or the protruding side of the pockets 15 to acquire an image including the printed portion 20 or 22 and the lattice pattern 21. The generation unit 1612 is configured to generate, from the image acquired by the acquisition unit 1611, an image for individual identification of the PTP sheet 1 subject to registration, and store them in the individual identification information DB 152.

The matching unit 162 is configured to match an image (hereinafter also referred to as a matching image) for individual identification of the PTP sheet 1 subject to matching against the registration image stored in the individual identification information DB 152 to identify an individual of the PTP sheet 1. The matching unit 162 includes an acquisition unit 1621, a generation unit 1622, and a determination unit 1623.

The acquisition unit 1621 is configured to capture an image of the PTP sheet 1 subject to matching with the camera 110 from the opening side or the protruding side of the pockets 15 to thereby acquire an image including the PTP sheet 20 or 22 and the lattice pattern 21. The generation unit 1622 is configured to generate, from the image acquired by the acquisition unit 1621, an image for individual identification of the PTP sheet 1 subject to matching.

The determination unit 1623 is configured to compare a matching image of the PTP sheet 1 subject to matching, generated by the generation unit 1622, with a registration image of the PTP sheet 1 subject to registration, stored in the individual identification information DB 152, to determine whether or not the PTP sheet 1 subject to matching is the same as any PTP sheet 1 subject to registration. The determination unit 1623 is also configured to display a determination result on the screen display unit 140 or/and output it to an external device via the communication I/F unit 120.

Figure 6:
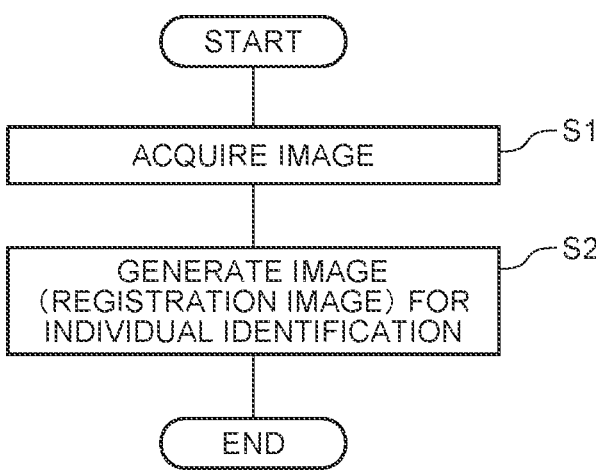
FIG. 6 is a flowchart illustrating an example of a registration operation performed by the PTP management device according to the first example embodiment of the present invention.
Figure 7:
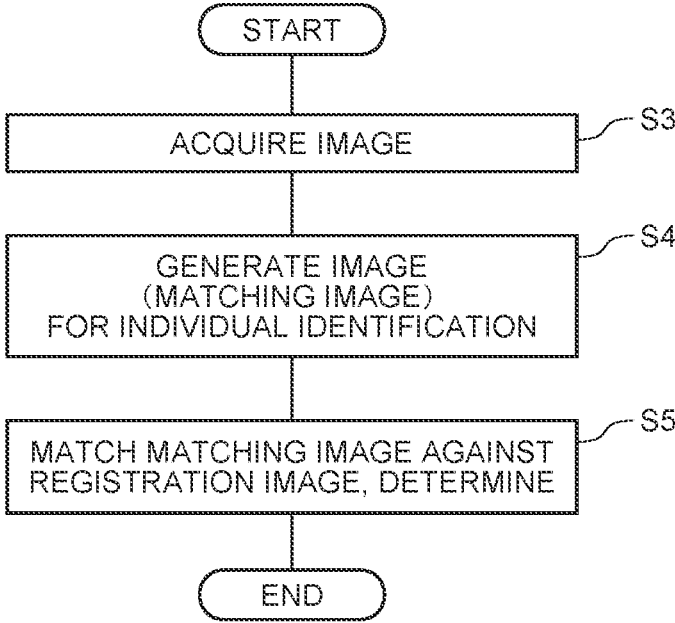
FIG. 7 is a flowchart illustrating an example of a matching operation performed by the PTP management device according to the first example embodiment of the present invention.

Next, operation of the PTP management device 100 will be described. Operation of the PTP management device 100 is mainly divided into a registration operation and a matching operation. FIG. 6 is a flowchart illustrating an example of a registration operation by the PTP management device 100. FIG. 7 is a flowchart illustrating an example of matching operation by the PTP management device 100.

First, a registration operation by the PTP management device 100 will be described. In the registration operation, as illustrated in FIG. 6, for each individual of the PTP sheet 1 subject to registration, the acquisition unit 1611 first captures an image of the PTP sheet 1 with the camera 110 from the opening side or the protruding side of the pockets 15 to thereby acquire an image including the printed portion 20 or 22 and the lattice pattern 21 (step S1). Then, for each image of an individual of the PTP sheet 1 acquired by the acquisition unit 1611, the generation unit 1612 generates an image (registration image) for individual identification from the acquired image, and stores it in the individual identification information DB 152 (step S2).

Next, a matching operation will be described. In the matching operation, as illustrated in FIG. 7, the acquisition unit 1621 first captures an image of an individual of the PTP sheet 1 subject to matching with the camera 110 from the opening side or the protruding side of the pockets 15 to thereby acquire an image including the printed portion 20 or 22 and the lattice pattern 21 (step S3). Then, the generation unit 1622 generates an image (matching image) for individual identification from the image acquired by the acquisition unit 1621 (step S4). Then, the determination unit 1623 compares the matching image generated by the generation unit 1622 with a registration image stored in the individual identification information DB 152 to thereby determine whether or not the individual of the PTP sheet 1 subject to matching is the same as any individual of the PTP sheet 1 subject to registration, and outputs the determination result (step S5).

According to the PTP management device 100 that is configured and operates as described above, it is possible to perform individual identification of the PTP sheet without need of a high-resolution imaging means. This is because images including printed portions and lattice patterns that are not the same in all individuals of the PTP sheets and are different between individuals are used as images for individual identification. Moreover, the printed portions and the lattice patterns can be imaged with sufficient accuracy with an imaging means having resolution of about 150 dpi. Meanwhile, artifact metrics such as printing blur and so-called object fingerprint are in micrometer order size. Therefore, it is difficult to image them with sufficient accuracy with 150 dpi.

Next, the respective units of the PTP management device 100 will be described in more detail.

First, the illumination unit 170 will be described.

First Example of Illumination Unit 170

Figure 8:
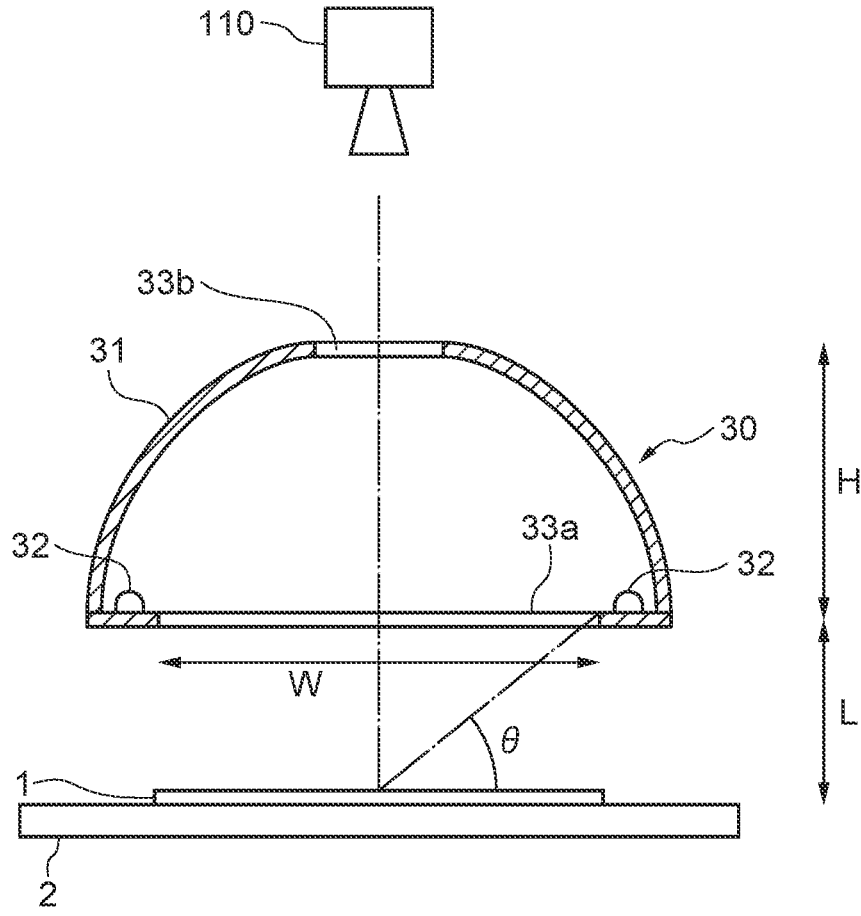
FIG. 8 is a schematic diagram illustrating a first example of an illumination unit in the PTP management device according to the first example embodiment of the present invention.

FIG. 8 is a schematic diagram illustrating a first example of the illumination unit 170. The illumination unit 170 of this example uses a dome illumination unit 30. The dome illumination unit 30 includes a hollow hemispherical dome 31. The dome 31 includes white light sources 32 such as white LEDs on the internal lower end edge. The white light emitted from the white light sources 32 is reflected inside the dome 31 and is diffused inside the dome 31. The light diffused inside the dome 31 is emitted to the outside of the dome from an opening 33a at the lower part of the dome 31, and made incident on the PTP sheet 1. At the top of the dome 31, a camera hole 33b is provided. The camera 110 captures an image of the PTP sheet 1 located below the dome 31 via the camera hole 33b. The PTP sheet 1 is placed on a member 2 such as a table or a conveyor belt. The light from the dome illumination unit 30, made incident on the PTP sheet 1, is reflected and diffused by the PTP sheet 1. The light reflected and diffused by the PTP sheet 1 passes through the opening 33a and the camera hole 33b and enters the camera 110.

In order to capture an image of the lattice pattern of the PTP sheet 1 as a clear light-dark pattern by using the dome illumination unit 30, the way of using the dome illumination unit 30 is different from a general way of using. That is, the dome illumination unit 30 is generally used to uniformly irradiate a work with light from all directions above the work. However, in this example, the light from the dome illumination unit 30 is prevented from being emitted to the PTP sheet 1 at an elevation angle that is smaller than a predetermined elevation angle. In other words, the light is caused to be emitted from the dome illumination unit 30 to the PTP sheet 1 at an elevation angle larger than a predetermined elevation angle. Here, an elevation angle corresponds to an angle θ shown on the PTP sheet 1 of FIG. 8. When the lattice pattern is irradiated with light at a small elevation angle, shades of irregularities of the lattice pattern disappear. On the contrary, when the lattice pattern is irradiated with light at a large elevation angle, the flat portion becomes white and the tilted portion becomes black, so that the lattice pattern can be shown as shades. Moreover, when the PTP sheet 1 is irradiated with light from the dome illumination unit 30, an image of the printed portion of the PTP sheet 1 can be captured as a sufficiently clear light-dark pattern.

Therefore, as illustrated in FIG. 8, the dome illumination unit 30 is disposed above the PTP sheet 1 with a predetermined distance L. With this configuration, the light from the dome illumination unit 30 is not emitted to the PTP sheet 1 at an elevation angle smaller than a predetermined elevation angle θth. As a result, an image of the printed portion and the lattice pattern of the PTP sheet 1 can be captured as a clear light-dark pattern. In the study made by the present inventor, in the case of using the dome 31 whose lateral width W is 110 mm to 160 mm and height H is 55 mm to 80 mm, the optimum distance L was 100 to 120 mm. For example, when the lateral width W is 110 mm and the distance L is 120 mm, the minimum elevation angle of the dome illumination made incident at a point on the surface of the PTP sheet 1 immediately below the center of the dome illumination unit 30 can be calculated from $\tan \theta = 120/55$, where $\theta$=about 65.5 degrees. Further, when the lateral width is 160 mm and the distance is 100 mm, the minimum elevation angle of the dome illumination made incident at a point on the surface can be calculated from $\tan \theta = 100/80$, where $\theta$=about 51.5 degrees. Accordingly, it can be said that the predetermined elevation angle θth is between about 51 degrees and 66 degrees.

While the dome illumination unit 30 of the reflection type is used in the present example, a dome illumination unit of a light guide plate type in which a light emitting element such as an LED is buried in a light guide plate may be used.

Second Example of Illumination Unit 170

Figure 9:
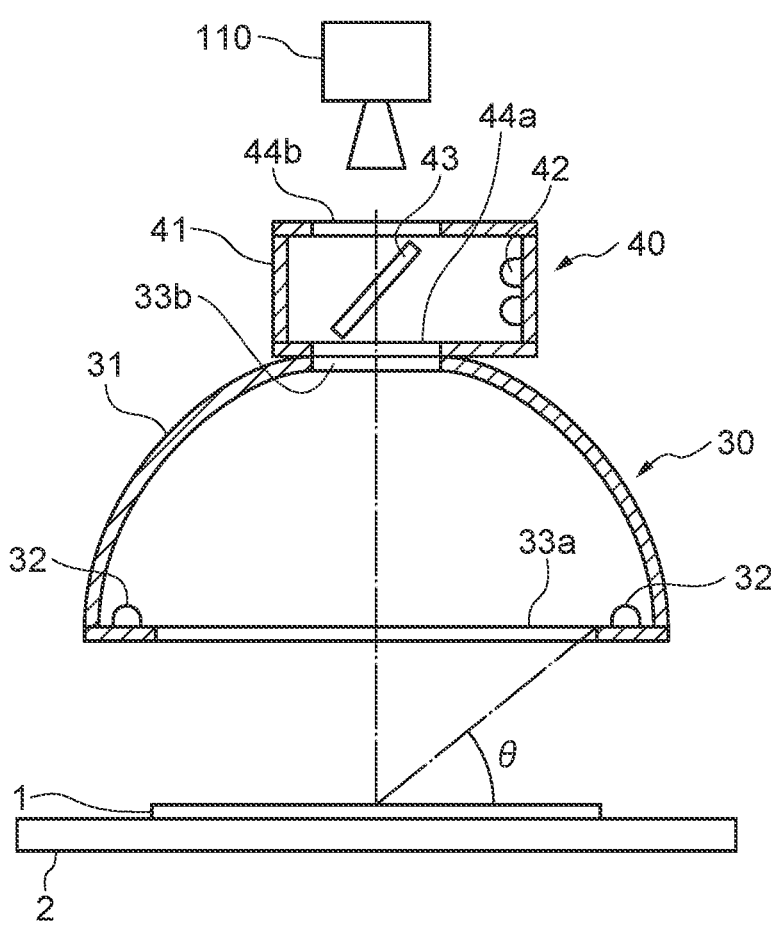
FIG. 9 is a schematic diagram illustrating a second example of an illumination unit in the PTP management device according to the first example embodiment of the present invention.

FIG. 9 is a schematic diagram illustrating a second example of the illumination unit 170. The illumination unit 170 of this example uses the dome illumination unit 30 and a coaxial vertical illumination unit 40. The dome illumination unit 30 is the same as that illustrated in FIG. 8. The coaxial vertical illumination unit 40 is disposed between the dome illumination unit 30 and the camera 110, and emits light from above the same axis as the imaging direction of the camera 110. The coaxial vertical illumination unit 40 includes a hollow case 41 in a rectangular parallelepiped shape. The case 41 includes white light sources 42 such as white LEDs on one side surface inside the case 41. The case 41 also includes a half mirror 43 inside it. The half mirror 43 faces the white light sources 42 and vertically downward, and is tilted at about 45 degrees with respect to the horizontal plane. Further, the lower surface and the upper surface of the case 41 have openings 44a and 44b. The white light emitted from the white light source 42 is partially reflected vertically downward by the half mirror 43, passes through the opening 44a, and irradiates the PTP sheet 1. Further, the light of the coaxial vertical illumination unit 40 reflected and diffused by the PTP sheet 1 passes through the half mirror 43 and passes through the opening 44b and enters the camera 110.

According to the illumination unit 170 illustrated in FIG. 9, the PTP sheet 1 is irradiated with light also from the camera hole 33b of the dome illumination unit 30 by the coaxial vertical illumination unit 40. Therefore, even when the surface of the PTP sheet 1 is slightly curved gently, the PTP sheet 1 can be irradiated with light uniformly. As a result, it is possible to capture an image of the printed portion and the lattice pattern of the PTP sheet 1 as a clear light-dark pattern, and at the same time, it is possible to prevent occurrence of light and dark due to a curve that adversely affects the individual identification. Although an illumination unit in which a dome illumination unit and a coaxial vertical illumination unit are combined has been known, a configuration that prevents light from entering the PTP sheet from the dome illumination unit at an elevation angle smaller than a predetermined elevation angle is not common.

Third Example of Illumination Unit 170

Figure 10:
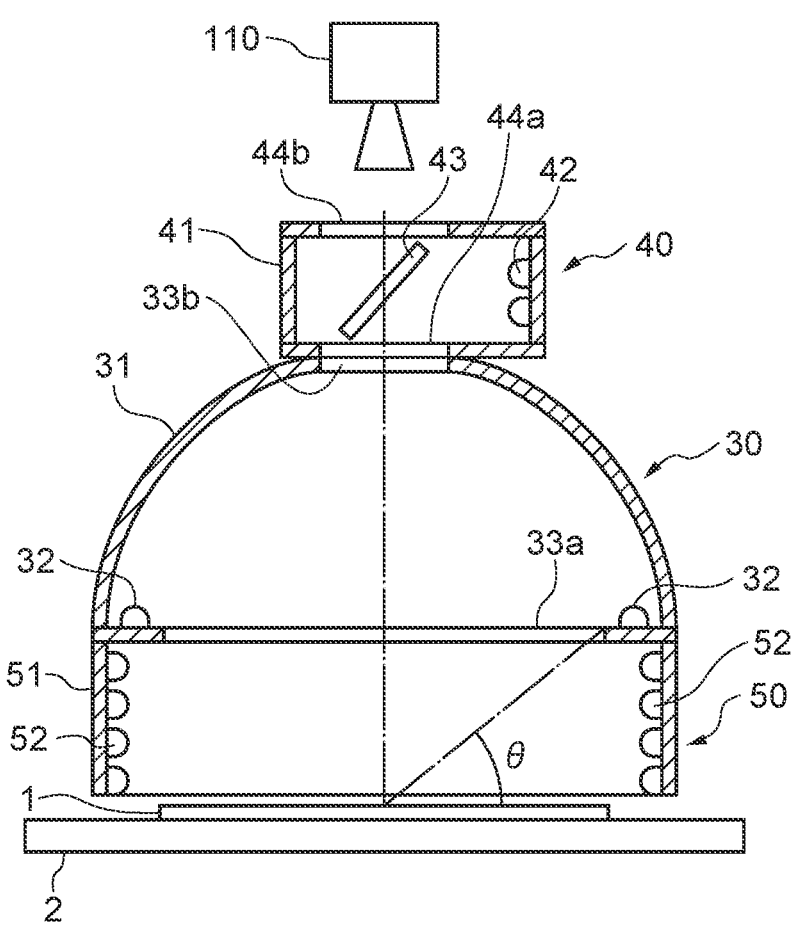
FIG. 10 is a schematic diagram illustrating a third example of an illumination unit in the PTP management device according to the first example embodiment of the present invention.

FIG. 10 is a schematic diagram illustrating a third example of the illumination unit 170. The illumination unit 170 of this example is suitable for capturing images appropriate for individual identification and appearance inspection respectively with single equipment (camera, illumination). The illumination unit 170 of this example uses the dome illumination unit 30, the coaxial vertical illumination unit 40, and a ring illumination unit 50. The dome illumination unit and the coaxial vertical illumination unit 40 are the same as those illustrated in FIG. 9. The ring illumination unit 50 is provided between the dome illumination unit 30 and the PTP sheet 1. Accordingly, from the ring illumination unit 50, light is emitted to the PTP sheet 1 at an elevation angle that is smaller than that of the dome illumination unit 30. The ring illumination unit 50 includes a ring-shaped case 51. The case 51 includes white light sources 52 such as white LEDs on the inner surface thereof. The white light emitted from the white light source 52 irradiates the PTP sheet 1. Further, the white light of the white light source 52 reflected and diffused by the PTP sheet 1 passes through the case 51 and the half mirror 43 and enters the camera 110. The white light source 52 of the ring illumination unit 50 is in an unlighted state when an image for individual identification is captured from the PTP sheet 1, and is in a lighted state when an image for appearance inspection is captured.

According to the illumination unit 170 illustrated in FIG. 10, in the state where the ring illumination unit 50 is unlighted, the case 51 functions as a shielding member that interrupts light made incident on the PTP sheet 1 at a small elevation angle from the external world. Therefore, by capturing an image of the PTP sheet 1 with the camera 110 in a state where the dome illumination unit 30 and the coaxial vertical illumination unit 40 are lighted and the ring illumination unit 50 is unlighted, it is possible to capture an image more suitable for individual identification without being affected by the external world.

Further, according to the illumination unit 170 illustrated in FIG. 10, in a state where the dome illumination unit 30, the coaxial vertical illumination unit 40, and the ring illumination unit 50 are lighted, the light irradiates the PTP sheet uniformly from all directions above it. Therefore, by capturing an image of the PTP sheet 1 with the camera 110 in that state, it is possible to eliminate the shades of the lattice pattern from an image to be captured. As a result, it is possible to capture an image suitable for appearance inspection such as printing failure, printing shift failure, punching shift failure, and the like of the PTP sheet 1.

Fourth Example of Illumination Unit 170

Figure 11:
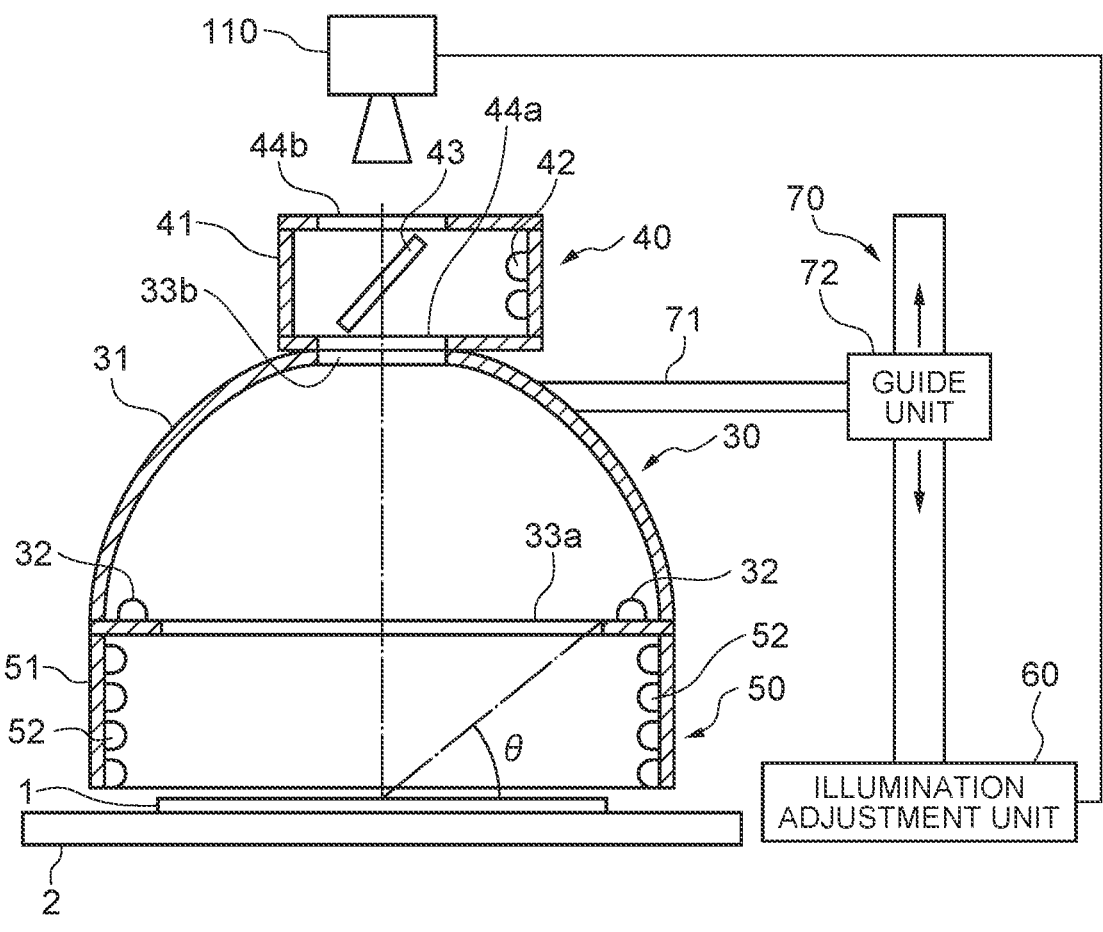
FIG. 11 is a schematic diagram illustrating a fourth example of an illumination unit in the PTP management device according to the first example embodiment of the present invention.

FIG. 11 is a schematic diagram illustrating a fourth example of the illumination unit 170. The illumination unit 170 of this example includes an illumination adjustment unit 60 that optimizes the distance between the PTP sheet 1 and the dome illumination unit 30. The illumination unit 170 also includes an elevating unit 70 that supports the dome illumination unit 30, and the coaxial vertical illumination unit 40 and the ring illumination unit 50 mounted above and below the dome illumination unit 30 integrally so that they can be elevated and lowered freely. The structure of the elevating unit 70 is arbitrary. For example, the elevating unit 70 may include an arm 71 that holds the dome illumination unit 30, the coaxial vertical illumination unit 40, and the ring illumination unit 50, and a guide unit 72 that guides the arm 71 slidably in a vertical direction. The guide unit 72 may be configured to include an electric motor and a screw shaft and nut mechanism rotatably driven by the electric motor.

The illumination adjustment unit 60 is configured to include a microprocessor and a memory for example, and is connected with the camera 110 and the guide unit 72 in a wired or wireless manner. The illumination adjustment unit 60 can elevate or lower the arm 71 to any position by giving a command to the guide unit 72. Moreover, the illumination adjustment unit 60 is able to capture an image of the PTP sheet 1 with the camera 110 by giving a command to the camera 110, and acquire the captured image. The illumination adjustment unit 60 is configured to capture an image of the lattice pattern of the PTP sheet 1 with the camera 110 by changing the distance between the PTP sheet 1 and the dome illumination unit 30 by controlling the elevating unit 70, and determine a distance at which a lattice pattern having desired image sharpness can be captured.

Figure 12:
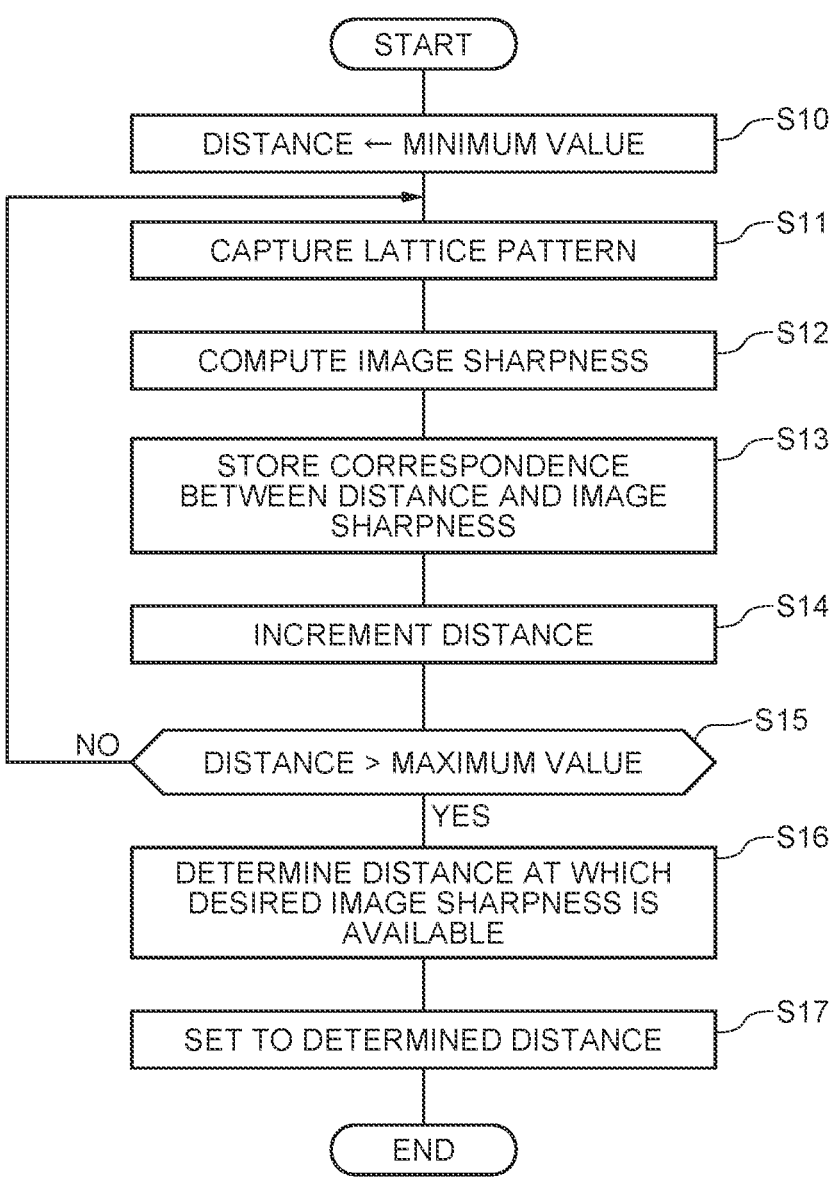
FIG. 12 is a flowchart illustrating an example of processing performed by an illumination adjustment unit used in the fourth example of the illumination unit in the PTP management device according to the first example embodiment of the present invention.

FIG. 12 is a flowchart illustrating an example of processing performed by the illumination adjustment unit 60. The illumination adjustment unit 60 performs the processing illustrated in FIG. 12, before execution of the registration operation of the PTP management device 100. The processing illustrated in FIG. 12 is performed by using a sample of the PTP sheet 1 subject to registration. The sample may be one of the PTP sheet 1 subject to registration, or a model having the same structure. The processing illustrated in FIG. 12 is performed in a state where the dome illumination unit 30 and the coaxial vertical illumination unit 40 are turned on and the ring illumination unit 50 is turned off.

Referring to FIG. 12, the illumination adjustment unit 60 controls the elevating unit 70 to set a distance L between the PTP sheet 1 and the dome illumination unit 30 to a predetermined minimum value (step S10). Then, the illumination adjustment unit 60 controls the camera 110 to capture an image of the PTP sheet 1 from the opening side or the protruding side of the pockets to thereby acquire an image of a printed portion and a lattice pattern (step S11). Then, the illumination adjustment unit 60 computes the image sharpness of the lattice pattern in the acquired image (step S12).

The image sharpness of the lattice pattern is an index representing the degree that the lattice pattern is visibly shown as a light-dark pattern. Any method may be used to compute the image sharpness of the lattice pattern. For example, the image sharpness of the lattice pattern may be computed according to Expression 1 and Expression 2 illustrated in FIG. 13. Here, Sh represents image sharpness of a lattice pattern, x represents a lateral width of a captured image, y represents a vertical width of a captured image, the total number of pixels represents the number of pixels of a captured image, G represents a pixel value, and i and j represent a lateral coordinate and a vertical coordinate of a pixel. The image sharpness Sh takes a larger value as the lattice pattern is shown more visibly. The image sharpness Sh also reflects the sharpness of the image portions other than the lattice pattern such as a printed portion and pockets shown on the captured image. However, the sharpness of the image portions other than the lattice pattern seems to be constant without being changed largely depending on the distance. Therefore, the superiority of the sharpness of the lattice pattern can be determined according to the magnitude of the image sharpness Sh. However, it is also possible to detect image portions other than the lattice pattern such as a printed portion and pockets from the captured image, and from an image in which all detected image portions are processed to black or white, compute the image sharpness according to the expressions illustrated in FIG. 13.

Then, the illumination adjustment unit 60 stores therein the distance L between the PTP sheet 1 and the dome illumination unit 30 when the image is captured, and image sharpness Sh computed from the image captured at that position, in association with each other (step S13). Then, the illumination adjustment unit 60 controls the elevating unit 70 to increment the distance L between the PTP sheet 1 and the dome illumination unit 30 by a minimum pitch set previously (step S14). Then, the illumination adjustment unit 60 determines whether or not the distance L after the increment exceeds a maximum value set previously (step S15). When the distance L does not exceed the maximum value, the illumination adjustment unit 60 returns to step S11 and repeats the same processing as that described above.

On the other hand, when the distance L exceeds the maximum value, the illumination adjustment unit 60 refers to the correspondence relation between the distance L and the image sharpness Sh stored therein to determine the distance L at which desired image sharpness is available (step S16). Desired image sharpness may be, for example, the maximum image sharpness in the correspondence relationship. Alternatively, desired image sharpness may be, for example, any image sharpness that is equal to or larger than a previously set threshold in the correspondence relationship. Then, the illumination adjustment unit 60 controls the elevating unit 70 to set the distance between the PTP sheet 1 and the dome illumination unit 30 so as to coincide with the determined distance L (step S17). Upon completion of adjustment by the illumination adjustment unit 60, the PTP management device 100 may start registration operation.

According to the illumination unit 170 illustrated in FIG. 11, it is possible to automatically determine and adjust the distance between the dome illumination unit 30 and the PTP sheet 1 suitable for capturing an image for individual identification of the PTP sheet 1. In the illumination unit 170 illustrated in FIG. 11, the illumination adjustment unit 60 and the elevating unit 70 are provided to the illumination unit 170 illustrated in FIG. 10. However, it is possible to provide the illumination adjustment unit 60 and the elevating unit 70 illustrated in FIG. 11 to the illumination unit 170 illustrated in FIG. 8 or to the illumination unit 170 illustrated in FIG. 9.

Next, the registration unit 161 and the matching unit 162 will be described in detail.

First, an acquisition unit 1611 of the registration unit 161 will be described in detail.

The acquisition unit 1611 may be configured to acquire an image of the PTP sheet 1 after being punched in sheet units, captured with the camera 110, in the manufacturing step of the PTP sheet 1 by the PTP packaging machine, for example.

In the manufacturing step of the PTP sheet 1, a conveyer for conveying the PTP sheet 1 in a predetermined posture may be provided. Accordingly, by installing the illumination unit 170 and the camera 110 as illustrated in FIGS. 8 to 11 on the conveyer, it is possible to acquire an image for individual identification of the PTP sheet 1. For example, in the case where an image is captured with the camera 110 arranged vertically above the conveyer when the punched PTP sheet 1 is conveyed by the conveyer in a state where the pockets 15 face above, the image is an image captured from the front surface side of the PTP sheet 1 (protruding side of the pockets 15) as illustrated in FIG. 1. Meanwhile, in the case where an image is captured with the camera 110 arranged vertically above the conveyer when the punched PTP sheet 1 is conveyed by the conveyer in a state where the pockets 15 face below, the image is an image captured from the rear surface side of the PTP sheet 1 (opening side of the pockets 15) as illustrated in FIG. 2.

In the PTP sheet 1 that is an object of the present embodiment, the printed portion 20 or 22 and the lattice pattern 21 are formed on both the front surface side and the rear surface side of the PTP sheet 1 as illustrated in FIGS. 1 and 2. Therefore, the acquisition unit 1611 may be configured to acquire an image captured from the front surface side of the PTP sheet 1 and not to acquire an image captured from the rear surface side of the PTP sheet 1. Alternatively, the acquisition unit 1611 may be configured to acquire an image captured from the rear surface side of the PTP sheet 1 and not to acquire an image captured from the front surface side of the PTP sheet 1. Alternatively, the acquisition unit 1611 may be configured to acquire both an image captured from the front surface side of the PTP sheet 1 and an image captured from the rear surface side of the PTP sheet 1. Hereinafter, description will be given below based on the assumption that the acquisition unit 1611 is configured to acquire only an image captured from the front surface side of the PTP sheet 1 for convenience of explanation.

The acquisition unit 1611 may be configured to acquire an image for appearance inspection, besides an image for individual identification of the punched PTP sheet 1. In that case, the illumination unit 170 illustrated in FIG. 10 or FIG. 11 may be used. The acquisition unit 1611 acquires an image for individual identification by capturing an image of the PTP sheet 1 with the camera 110 in a state where the dome illumination unit 30 and the coaxial vertical illumination unit 40 are lighted and the ring illumination unit 50 is unlighted. Further, the acquisition unit 1611 acquires an image for appearance inspection by capturing an image of the PTP sheet 1 with the camera 110 in a state where the dome illumination unit 30, the coaxial vertical illumination unit 40, and the ring illumination unit 50 are lighted. As described above, by capturing images suitable for individual identification and appearance inspection respectively with single equipment (camera 110 and illumination unit 170), it is possible to reduce the installment space and the cost comparted with a configuration of installing two sets of camera and illumination equipment. However, it is also acceptable to capture an image only for individual identification, of course.

Next, a generation unit 1612 of the registration unit 161 will be described in detail.

The generation unit 1612 first generates an image subjected to normalization from an image for individual identification acquired by the acquisition unit 1611. The image subjected to normalization is an image in which the orientation and the size of the PTP sheet are aligned. Any method may be used for generating an image subjected to normalization. For example, the generation unit 1612 may generate an image subjected to normalization in accordance with a result of matching between a template image having a printed portion that is completely the same as the printed portion 20 (or 22) and the acquired image. Hereinafter, an image subjected to normalization is called a normalized image. Note that even by a generation unit 1622 of the matching unit 162, an image subjected to normalization is generated from the acquired image by the same method as that of normalizing the image by the generation unit 1612.

Then, the generation unit 1612 generates a registration image from the normalized image. For example, the generation unit 1612 may use, as a registration image, a set of predetermined partial images the number of which is one or more and n pieces or less, among n pieces of partial images obtained by vertically dividing the normalized image by n (n is positive integer of 2 or larger). Description will be given by using the PTP sheet 1 illustrated in FIG. 1 as an example. A predetermined one of the two partial images, obtained by equally dividing the PTP sheet 1 into two vertically, may be used as a registration image. Alternatively, any one or two or three or four of the five partial images, obtained by dividing the PTP sheet 1 by four lateral slits 18, may be used as a partial image. As described above, by using an image having a size smaller than the normalized image, it is possible to reduce the storage capacity necessary for registration images and to realize high-speed matching.

Next, the matching unit 162 will be described in detail.

First, an acquisition unit 1621 of the matching unit 162 will be described in detail.

The acquisition unit 1621 may be configured to capture, with the camera 110, an image of the PTP sheet 1 that requires authenticity determination, source confirmation, or the like to thereby acquire an image for individual identification. The acquisition unit 1621 acquires an image of the PTP sheet 1 of the side same as that of an image for individual identification acquired by the acquisition unit 1611 of the registration unit 161. That is, in the case where the acquisition unit 1611 is configured to acquire an image captured from the front surface side of the PTP sheet 1 and not to acquire an image captured from the rear surface side of the PTP sheet 1, the acquisition unit 1621 may acquire only an image for individual identification captured from the front surface side of the PTP sheet 1 subject to matching. In the case where the acquisition unit 1611 is configured to acquire an image captured from the rear surface side of the PTP sheet 1 and not to acquire an image captured from the front surface side of the PTP sheet 1, the acquisition unit 1621 may acquire only an image for individual identification captured from the rear surface side of the PTP sheet 1 subject to matching. In the case where the acquisition unit 1611 acquires images captured from both the front surface side and the rear surface side of the PTP sheet 1, the acquisition unit 1621 acquires images for individual identification captured from both the front surface side and the rear surface side of the PTP sheet 1 subject to matching.

Next, the generation unit 1622 of the matching unit 162 will be described in detail.

The generation unit 1622 first generates an image subjected to normalization (normalized image) from an image for individual identification acquired by the acquisition unit 1621, by the same method as the generation unit 1612. Then, the generation unit 1622 generates a matching image from the normalized image by the same method as the generation unit 1612.

Next, a determination unit 1623 of the matching unit 162 will be described in detail.

The determination unit 1623 matches the matching image generated by the generation unit 1622 against the registration image stored in the individual identification information DB 152. Any method may be used to perform matching between the two images. For example, two images themselves may be compared with each other, or feature values obtained by applying any transformation on two images may be compared with each other. For example, frequency spectrum images obtained by applying frequency transform such as Fourier transform to two images respectively may be compared with each other. Alternatively, two images may be first applied with frequency transform such as Fourier transform to be transformed into frequency spectrum images respectively, and then, the frequency spectrum images may be applied with polar conversion or log polar conversion, and polar coordinate images (Fourier Mellin feature images) obtained therefrom may be compared with each other. Alternatively, two images may be first applied with frequency transform such as Fourier transform to be transformed into frequency spectrum images respectively, and then, the frequency spectrum images may be applied with polar conversion or log polar conversion to be transformed in to Fourier Mellin features, and the Fourier Mellin features may be further applied with frequency conversion, and phase images obtained therefrom may be compared with each other. Hereinafter, an example of a matching method performed by the determination unit 1623 will be described.

Figure 14:
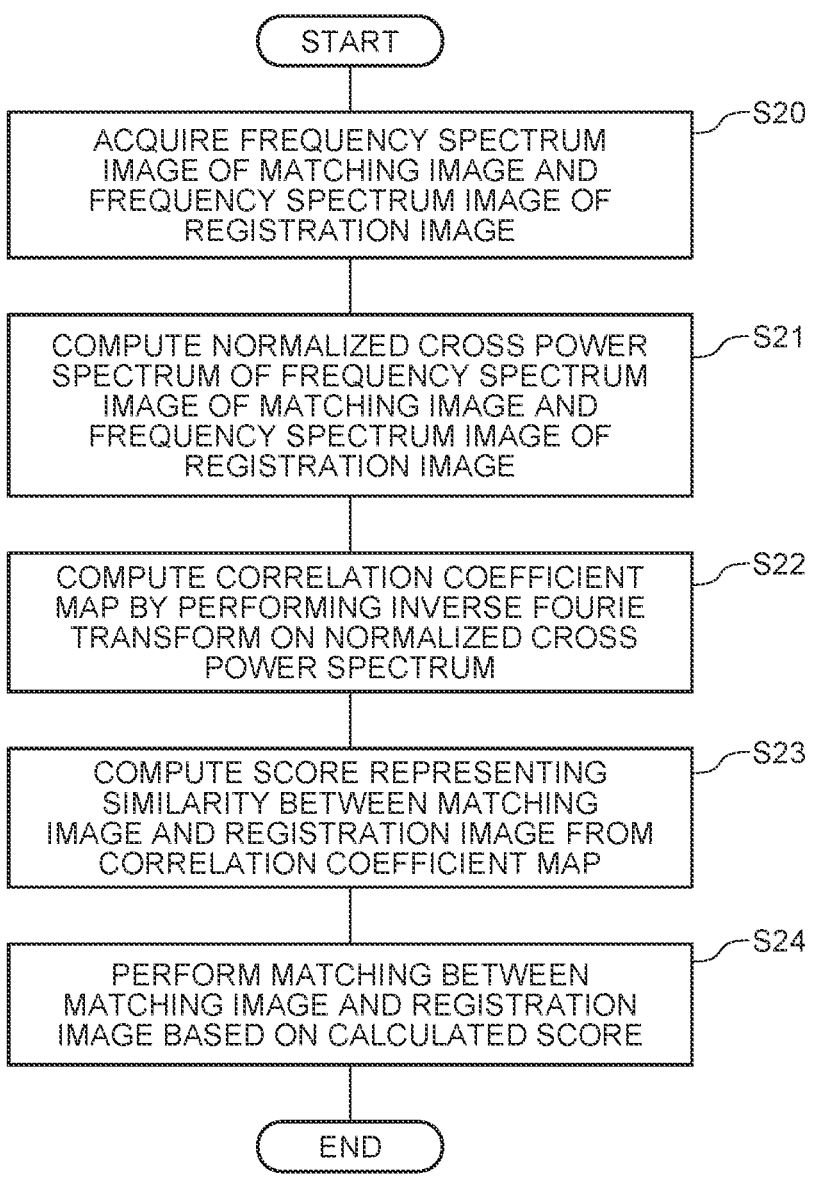
FIG. 14 is a flowchart illustrating an example of processing performed by the matching unit in the PTP management device according to the first example embodiment of the present invention.

FIG. 14 is a flowchart illustrating an example of a process of matching the matching image against a registration image by the determination unit 1623. Referring to FIG. 14, the determination unit 1623 first performs discrete Fourier transform on the matching image and the registration image to acquire a frequency spectrum image of the matching image and a frequency spectrum image of the registration image (step S20). When there are a plurality of registration images, the determination unit 1623 acquires a frequency spectrum image from each of the registration images. Then, for each of the registration images, the determination unit 1623 computes a normalized cross power spectrum of the frequency spectrum image of the matching image and the frequency spectrum image of the registration image (step S21). Then, for each of the registration images, the determination unit 1623 performs inverse Fourier transform on the normalized cross power spectrum to compute a correlation coefficient map (step S22). Then, for each of the registration images, the determination unit 1623 computes a score representing the similarity between the matching image and the registration image from the correlation coefficient map (step S23). Then, on the basis of the score computed for each of the registration images, the determination unit 1623 performed matching between the matching image and the registration image (step S24). For example, when the best score among the scores computed for the respective registration images is equal to or larger than a predetermined threshold, the determination unit 1623 determines that the matching image coincides with (is identical to) the registration image having the best score. That is, the determination unit 1623 determines that the PTP sheet of the matching image is the same individual as the PTP sheet of the registration image having the best score. On the other hand, when the best score is less than the threshold, the determination unit 1623 determines that the matching image does not coincide with (is not identical to) any of the registration images. That is, the determination unit 1623 determines that the PTP sheet of the matching image is not the same individual as the PTP sheet of any registration images.

Next, a modification of the present embodiment will be described.

In the above description, the acquisition unit 1611 acquires an image of the PTP sheet 1 captured after being punched in sheet units, in the manufacturing step of the PTP sheet 1 by the PTP packaging machine. However, in the manufacturing step of the PTP sheet 1 by the PTP packaging machine, the acquisition unit 1611 may acquire an image obtained by capturing a portion to be a sheet before punching that finally becomes the PTP sheet 1, as a registration image.

Further, in the above description, one PTP management device 100 includes the registration unit 161 and the matching unit 162. However, a PTP management device that includes the registration unit 161 but does not include the matching unit 162, or a PTP management device that includes the matching unit 162 but does not include the registration unit 161 may be acceptable.

Moreover, the individual identification information DB 152 may store frequency spectrum images obtained by performing frequency transform on registration images or the like as registration images, instead of storing registration images.

Second Example Embodiment

Figure 15:
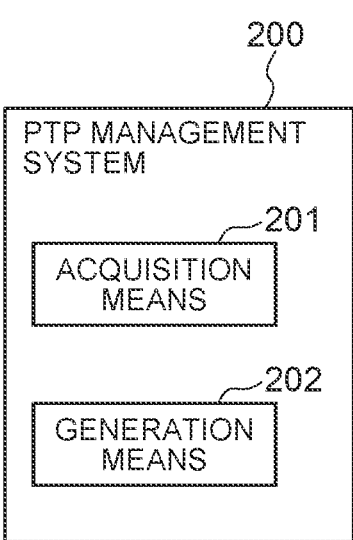
FIG. 15 is a block diagram of an PTP management system according to a second example embodiment of the present invention.

Next, a second example embodiment of the present invention will be described with reference to FIG. 15. FIG. 15 is a block diagram of a PTP management system 200 according to the present embodiment. The PTP management system 200 is a system for managing an individual of a PTP sheet. A PTP sheet has a transparent or translucent container film including a plurality of pockets provided on one surface and each having opening, and a flange portion provided on the periphery of the pockets and constituting the one surface. Each of the pockets contains a content. The PTP sheet has a structure in which the pockets are sealed with a cover film by heat bonding on the flange portion. The cover film is breakable and includes a predetermined printed portion on at least one surface.

Referring to FIG. 15, the PTP management system 200 includes an acquisition means 201 and a generation means 202.

The acquisition means 201 is configured to capture an image of a PTP sheet with a camera from the opening side or the protruding side of the pockets having a printed portion, to thereby acquire an image including the printed portion and a lattice pattern formed on the cover film at the time of heat bonding. The acquisition means 201 may have the same configuration as that of the acquisition unit 1611 or the acquisition unit 1621 of FIG. 5 for example, but it is not limited thereto.

The generation means 202 is configured to generate, from the image acquired by the acquisition means 201, an image for individual identification to be used for identifying the PTP sheet. The generation means 202 may have the same configuration as that of the generation unit 1612 or the generation unit 1622 of FIG. 5 for example, but is not limited thereto.

The PTP management system 200 configured as described above operates as described below. The acquisition means 201 captures an image of a PTP sheet with a camera from the opening side or the protruding side of the pockets having a printed portion, to thereby acquire an image including the printed portion and a lattice pattern formed on the cover film at the time of heat bonding. Then, the generation means 202 generates, from the image acquired by the acquisition means 201, an image for individual identification to be used for identifying the PTP sheet.

Since the PTP management system 200 of the present invention is configured and operates as described above, it is possible to perform individual identification of the PTP sheet without need of a high-resolution imaging means. This is because images, including printed portions and lattice patterns that are not the same in all individuals of the PTP sheet and are different between individuals, are used as images for individual identification.

While the present invention has been described with reference to the exemplary embodiments described above, the present invention is not limited to the above-described embodiments. The form and details of the present invention can be changed within the scope of the present invention in various manners that can be understood by those skilled in the art.

INDUSTRIAL APPLICABILITY

The present invention is applicable to authenticity determination and individual identification of a PTP sheet.

The whole or part of the example embodiments disclosed above can be described as, but not limited to, the following supplementary notes.
(Supplementary Note 1)

A PTP management system that is a system for managing an individual of a PTP sheet, the PTP sheet including a transparent or translucent container film including a plurality of pockets provided on one surface and each having an opening, and a flange portion provided on periphery of the pockets and constituting the one surface, each of the pockets containing a content, the pockets being sealed with a cover film by heat bonding on the flange portion, the cover film being breakable and including a predetermined printed portion on at least one surface, the PTP management system comprising:

an acquisition unit that captures an image of the PTP sheet with a camera from an opening side or a protruding side of the pockets having the printed portion, to thereby acquire the image including the printed portion and a lattice pattern image formed on the cover film at the time of heat bonding; and a generation unit that generates, from the acquired image, an image for individual identification to be used for identifying the PTP sheet.
(Supplementary Note 2)

The PTP management system according to supplementary note 1, further comprising an illumination unit that illuminates the PTP sheet with light at an elevation angle that is equal to or larger than a predetermined elevation angle.
(Supplementary Note 3)

The PTP management system according to supplementary note 2, wherein the illumination unit includes a dome illumination unit.
(Supplementary Note 4)

The PTP management system according to supplementary note 3, wherein the illumination unit further includes a coaxial vertical illumination unit.
(Supplementary Note 5)

The PTP management system according to supplementary note 3 or 4, wherein the illumination unit further includes a ring illumination unit that is provided between the dome illumination unit and the PTP sheet and is turned off at the time of capturing the image.
(Supplementary Note 6)

The PTP management system according to supplementary note 5, wherein the ring illumination unit is turned on when an image for appearance inspection of the PTP sheet is captured with the camera.

(Supplementary Note 7)

The PTP management system according to any of supplementary notes 3 to 6, further comprising an illumination adjustment unit that captures an image of the lattice pattern of the PTP sheet with the camera by changing a distance between the PTP sheet and the dome illumination unit, and determines the distance at which the lattice pattern having desired image sharpness is available.
(Supplementary Note 8)

The PTP management system according to any of supplementary notes 1 to 7, further comprising a matching unit that matches the image for individual identification against an image for individual identification of the PTP sheet acquired and stored in advance.
(Supplementary Note 9)

A PTP management method for managing an individual of a PTP sheet, the PTP sheet including a transparent or translucent container film including a plurality of pockets provided on one surface and each having an opening, and a flange portion provided on periphery of the pockets and constituting the one surface, each of the pockets containing a content, the pockets being sealed with a cover film by heat bonding on the flange portion, the cover film being breakable and including a predetermined printed portion on at least one surface, the PTP management method comprising:

capturing an image of the PTP sheet with a camera from an opening side or a protruding side of the pockets having the printed portion, thereby acquiring the image including the printed portion and a lattice pattern image formed on the cover film at the time of heat bonding; and from the acquired image, generating an image for individual identification to be used for identifying the PTP sheet.
(Supplementary Note 10)

The PTP management method according to supplementary note 9, further comprising capturing the image in a state of illuminating the PTP sheet with light at an elevation angle that is equal to or larger than a predetermined elevation angle.
(Supplementary Note 11)

The PTP management method according to supplementary note 10, wherein the illuminating is performed by a dome illumination unit.
(Supplementary Note 12)

The PTP management method according to supplementary note 11, wherein the illuminating is further performed by a coaxial vertical illumination unit.
(Supplementary Note 13)

The PTP management method according to supplementary note 11 or 12, wherein a ring illumination unit is provided between the dome illumination unit and the PTP sheet, the ring illumination unit being turned off at the time of capturing the image.
(Supplementary Note 14)

The PTP management method according to supplementary note 13, wherein the ring illumination unit is turned on when an image for appearance inspection of the PTP sheet is captured with the camera.
(Supplementary Note 15)

The PTP management method according to any of supplementary notes 11 to 14, further comprising before capturing the image, capturing an image of the lattice pattern of the PTP sheet with the camera by changing a distance between the PTP sheet and the dome illumination unit, and determining the distance at
which the lattice pattern having desired image sharp-
ness is available.
(Supplementary Note 16)
The PTP management method according to any of supple-
mentary notes 9 to 15, further comprising
matching the image for individual identification against
an image for individual identification of the PTP sheet
acquired and stored in advance.
(Supplementary Note 17)
A computer-readable medium storing thereon a program
for causing a computer for managing an individual of a PTP
sheet to execute processing, the PTP sheet including a
transparent or translucent container film including a plurality
of pockets provided on one surface and each having an
opening, and a flange portion provided on periphery of the
pockets and constituting the one surface, each of the pockets
containing a content, the pockets being sealed with a cover
film by heat bonding on the flange portion, the cover film
being breakable and including a predetermined printed por-
tion on at least one surface, the processing including
capturing an image of the PTP sheet with a camera from
an opening side or a protruding side of the pockets
having the printed portion, thereby acquiring the image
including the printed portion and a lattice pattern image
formed on the cover film at the time of heat bonding;
and
from the acquired image, generating an image for indi-
vidual identification to be used for identifying the PTP
sheet.
(Supplementary Note 18)
An illumination device used for capturing an image of a
PTP sheet with a camera, wherein the device comprising:
a dome illumination unit that illuminates the PTP sheet
with light at an elevation angle that is equal to or larger
than a predetermined elevation angle;
a coaxial vertical illumination unit provided between the
dome illumination unit and the camera; and
a ring illumination unit provided between the dome
illumination unit and the PTP sheet, the ring illumina-
tion unit being turned off at the time of capturing an
image for individual identification of the PTP sheet and
being turned on at the time of capturing an image for
appearance inspection of the PTP sheet.

REFERENCE SIGNS LIST

1 PTP sheet
11-12 long side portion
13-14 short side portion
15 pocket
16 tablet
17 container film
18 lateral slit
19 cover film
20 printed portion
21 lattice pattern
22 printed portion
30 dome illumination unit
31 dome
32 white light source
33a opening
33b camera hole
34 member
40 coaxial vertical illumination unit
41 case
42 white light source

20

43 half mirror
44a, 44b opening
50 ring illumination unit
51 case
52 white light source
60 illumination adjustment unit
70 elevating unit
71 arm
72 guide unit
100 PTP management device
110 camera
120 communication I/F unit
130 operation input unit
140 screen display unit
150 storage unit
151 program
152 individual identification information DB
160 arithmetic processing unit
161 registration unit
1611 acquisition unit
1612 generation unit
162 matching unit
1621 acquisition unit
1622 generation unit
1623 determination unit
170 illumination unit

What is claimed is:
1. A Press Through Pack (PTP) management system,
comprising:
a memory containing program instructions; and
a processor coupled to the memory, wherein the processor
is configured to execute the program instructions to:
capture an image of a PTP sheet with a camera in a state
of illuminating the PTP sheet with light at an elevation
angle that is equal to or larger than a predetermined
elevation angle, the PTP sheet including a transparent
or translucent container film including a plurality of
pockets provided on one surface and each having an
opening, and a flange portion provided on periphery of
the pockets and constituting the one surface, each of the
pockets containing a content, the pockets being sealed
with a cover film by heat bonding on the flange portion,
the cover film being breakable and including a prede-
termined printed portion on at least one surface,
the image of the PTP sheet being captured from an
opening side or a protruding side of the pockets having
the printed portion, to thereby acquire the image
including the printed portion and a lattice pattern image
formed on the cover film at the time of heat bonding;
and
from the acquired image, generate an image for individual
identification to be used for identifying the PTP sheet.
2. The PTP management system according to claim 1,
wherein the illuminating is performed by dome lighting.
3. The PTP management system according to claim 2,
wherein the illuminating is further performed by coaxial
vertical lighting.
4. The PTP management system according to claim 2,
wherein a ring lighting is provided between the dome
lighting and the PTP sheet, and
wherein the ring lighting is turned off at the time of
capturing the image.
5. The PTP management system according to claim 4,
wherein the ring lighting is turned on when an image for
appearance inspection of the PTP sheet is captured with the
camera.

6. The PTP management system according to claim 2, wherein the processor is further configured to execute the instructions to, before capturing the image, capture an image of the lattice pattern of the PTP sheet with the camera by changing a distance between the PTP sheet and the dome lighting, and determine the distance at which the lattice pattern having desired image sharpness is available.

7. The PTP management system according to claim 1, wherein the processor is further configured to execute the instructions to match the image for individual identification against an image for individual identification of the PTP sheet acquired and stored in advance.

8. A Press Through Pack (PTP) management method comprising:

capturing an image of a PTP sheet with a camera in a state of illuminating the PTP sheet with light at an elevation angle that is equal to or larger than a predetermined elevation angle, the PTP sheet including a transparent or translucent container film including a plurality of pockets provided on one surface and each having an opening, and a flange portion provided on periphery of the pockets and constituting the one surface, each of the pockets containing a content, the pockets being sealed with a cover film by heat bonding on the flange portion, the cover film being breakable and including a predetermined printed portion on at least one surface, the image of the PTP sheet being captured from an opening side or a protruding side of the pockets having the printed portion, thereby acquiring the image including the printed portion and a lattice pattern image formed on the cover film at the time of heat bonding; and from the acquired image, generating an image for individual identification to be used for identifying the PTP sheet.

9. The PTP management method according to claim 8, wherein the illuminating is performed by dome lighting.

10. The PTP management method according to claim 9, wherein the illuminating is further performed by coaxial vertical lighting.

11. The PTP management method according to claim 9, wherein a ring lighting is provided between the dome lighting and the PTP sheet, the ring lighting being turned off at the time of capturing the image.

12. The PTP management method according to claim 11, wherein the ring lighting is turned on when an image for appearance inspection of the PTP sheet is captured with the camera.

13. The PTP management method according to claim 9, further comprising before capturing the image, capturing an image of the lattice pattern of the PTP sheet with the camera by changing a distance between the PTP sheet and the dome lighting, and determining the distance at which the lattice pattern having desired image sharpness is available.

14. The PTP management method according to claim 8, further comprising matching the image for individual identification against an image for individual identification of the PTP sheet acquired and stored in advance.

15. A non-transitory computer-readable medium storing thereon a program comprising instructions for causing a computer to execute processing to:

capture an image of a Press Through Pack (PTP) sheet with a camera in a state of illuminating the PTP sheet with light at an elevation angle that is equal to or larger than a predetermined elevation angle, the PTP sheet including a transparent or translucent container film including a plurality of pockets provided on one surface and each having an opening, and a flange portion provided on periphery of the pockets and constituting the one surface, each of the pockets containing a content, the pockets being sealed with a cover film by heat bonding on the flange portion, the cover film being breakable and including a predetermined printed portion on at least one surface, the image of the PTP sheet being captured from an opening side or a protruding side of the pockets having the printed portion, to thereby acquire the image including the printed portion and a lattice pattern image formed on the cover film at the time of heat bonding; and from the acquired image, generate an image for individual identification to be used for identifying the PTP sheet.

* * * * *